US011086931B2

(12) United States Patent
Aguirre-Suarez et al.

(10) Patent No.: US 11,086,931 B2
(45) Date of Patent: Aug. 10, 2021

(54) AUDIO AND VISUAL ASSET MATCHING PLATFORM INCLUDING A MASTER DIGITAL ASSET

(71) Applicant: Audiobyte LLC, Port Washington, NY (US)

(72) Inventors: Omar Aguirre-Suarez, Fremont, CA (US); Brian Huy Vo, New York, NY (US); John vanSuchtelen, San Francisco, CA (US); Andrew Lawrence Blacker, Port Washington, NY (US)

(73) Assignee: AudioByte LLC, Port Washington, NY (US)

( * ) Notice: Subject to any disclaimer, the term of this patent is extended or adjusted under 35 U.S.C. 154(b) by 169 days.

(21) Appl. No.: 16/237,167

(22) Filed: Dec. 31, 2018

(65) Prior Publication Data

US 2020/0210475 A1 Jul. 2, 2020

(51) Int. Cl.
*G06F 17/00* (2019.01)
*G06F 16/683* (2019.01)
*G11B 27/031* (2006.01)
*G06F 16/638* (2019.01)
*G06F 16/68* (2019.01)

(52) U.S. Cl.
CPC .......... *G06F 16/685* (2019.01); *G06F 16/638* (2019.01); *G06F 16/686* (2019.01); *G11B 27/031* (2013.01)

(58) Field of Classification Search
None
See application file for complete search history.

(56) References Cited

U.S. PATENT DOCUMENTS

| 5,799,276 | A  | 8/1998  | Komissarchik et al. |
| 6,950,804 | B2 | 9/2005  | Strietzel |
| 6,968,364 | B1 | 11/2005 | Wong et al. |
| 7,199,300 | B2 | 4/2007  | Kodama et al. |

(Continued)

FOREIGN PATENT DOCUMENTS

WO    WO2013003854 A2    1/2013

OTHER PUBLICATIONS

"International Search Report" and "Written Opinion", Patent Cooperation Treaty Application No. PCT/US2012/045302, dated Sep. 17, 2012, 7 pages.

*Primary Examiner* — Hasanul Mobin
(74) *Attorney, Agent, or Firm* — Carr & Ferrell LLP

(57) ABSTRACT

Provided are computer-implemented methods and systems for implementing and utilizing an audio and visual asset matching platform. The audio and visual asset matching platform may include a first interface, a digital asset creation platform, an asset matching engine, and a user feedback engine. The first interface may be configured to select at least one master digital asset. The digital asset creation platform may be configured to create digital assets, the digital assets comprising at least one of text, audio, image, video, 3D/4D virtual environments, and animation files and metadata. The asset matching engine may be configured to match digital assets and generate at least one output digital asset. The user feedback engine may be configured to monitor and analyze behavior in response to receipt of at least one output digital asset and generate feedback metrics to improve the matching of the asset matching engine.

20 Claims, 7 Drawing Sheets

(56) References Cited

U.S. PATENT DOCUMENTS

| | | |
|---|---|---|
| 7,973,230 B2 | 7/2011 | Mahowald |
| 8,311,823 B2 | 11/2012 | Bloebaum et al. |
| 8,543,141 B2 | 9/2013 | Meiby et al. |
| 8,831,763 B1* | 9/2014 | Sharifi .................. G10L 25/54 700/94 |
| 9,262,522 B2 | 2/2016 | Guthery et al. |
| 9,813,366 B2 | 11/2017 | Guthery et al. |
| 9,819,622 B2 | 11/2017 | Guthery et al. |
| 10,200,323 B2 | 2/2019 | Guthery et al. |
| 10,956,490 B2 | 3/2021 | Aguirre-Suarez et al. |
| 2001/0014876 A1 | 8/2001 | Miyashita |
| 2002/0082059 A1 | 6/2002 | Nariai et al. |
| 2002/0099552 A1* | 7/2002 | Rubin .................. G09F 27/00 704/270 |
| 2002/0120564 A1 | 8/2002 | Strietzel |
| 2003/0095550 A1 | 5/2003 | Lewis et al. |
| 2004/0260470 A1 | 12/2004 | Rast |
| 2005/0126371 A1 | 6/2005 | Kodama et al. |
| 2005/0281541 A1 | 12/2005 | Logan et al. |
| 2006/0041505 A1* | 2/2006 | Enyart .................. H04L 51/00 705/40 |
| 2006/0047580 A1* | 3/2006 | Saha .................. G06Q 30/0633 705/26.62 |
| 2006/0074769 A1* | 4/2006 | Looney .............. G06Q 30/0251 705/14.66 |
| 2007/0166683 A1* | 7/2007 | Chang .................. G09B 21/009 434/307 R |
| 2007/0276733 A1* | 11/2007 | Geshwind .............. G06Q 30/02 705/14.49 |
| 2008/0071752 A1 | 3/2008 | Azuma et al. |
| 2008/0097754 A1 | 4/2008 | Goto et al. |
| 2008/0147215 A1 | 6/2008 | Kim et al. |
| 2008/0220797 A1* | 9/2008 | Meiby .................. G06Q 10/107 455/466 |
| 2008/0304808 A1 | 12/2008 | Newell et al. |
| 2008/0306995 A1* | 12/2008 | Newell .................. G06F 16/58 |
| 2009/0012849 A1 | 1/2009 | Penrose Barton et al. |
| 2009/0037254 A1 | 2/2009 | Colando |
| 2009/0051487 A1 | 2/2009 | Sarig et al. |
| 2009/0083228 A1* | 3/2009 | Shatz .................. G06F 16/71 |
| 2009/0165634 A1 | 7/2009 | Mahowald |
| 2010/0131849 A1 | 5/2010 | Kim et al. |
| 2010/0145794 A1 | 6/2010 | Barger et al. |
| 2010/0306073 A1 | 12/2010 | Young |
| 2011/0196726 A1 | 8/2011 | Poellnitz |
| 2012/0004910 A1 | 1/2012 | Quidilig et al. |
| 2012/0159337 A1 | 6/2012 | Travilla et al. |
| 2012/0221975 A1 | 8/2012 | Juristovski et al. |
| 2013/0006627 A1 | 1/2013 | Guthery et al. |
| 2013/0238762 A1* | 9/2013 | Raleigh .............. H04L 67/1097 709/219 |
| 2013/0251340 A1* | 9/2013 | Jiang .................. G06K 9/4676 386/244 |
| 2014/0344956 A1 | 11/2014 | Garben |
| 2015/0049910 A1 | 2/2015 | Ptucha et al. |
| 2015/0154205 A1 | 6/2015 | Grano et al. |
| 2015/0245107 A1 | 8/2015 | Klappert et al. |
| 2016/0019298 A1 | 1/2016 | Brodie et al. |
| 2016/0164811 A1 | 6/2016 | Guthery et al. |
| 2016/0191163 A1* | 6/2016 | Preston .................. G01M 11/319 398/16 |
| 2016/0259794 A1 | 9/2016 | Hickman et al. |
| 2016/0314120 A1* | 10/2016 | Dauderman .......... G06F 16/437 |
| 2017/0034088 A1 | 2/2017 | Guthery et al. |
| 2017/0251249 A1 | 8/2017 | Seo et al. |
| 2018/0103000 A1 | 4/2018 | Guthery et al. |
| 2018/0262452 A1 | 9/2018 | Guthery et al. |
| 2019/0156222 A1* | 5/2019 | Emma .................. G06N 5/022 |
| 2019/0279649 A1 | 9/2019 | Srinivasan et al. |
| 2019/0306100 A1 | 10/2019 | Guthery et al. |
| 2019/0339688 A1 | 11/2019 | Cella et al. |
| 2020/0004752 A1* | 1/2020 | Majumdar .............. G06N 10/00 |
| 2020/0129061 A1 | 4/2020 | Goodsitt et al. |
| 2021/0149951 A1 | 5/2021 | Aguirre-Suarez et al. |

\* cited by examiner

| | Master Digital Asset | Slave Digital Asset | Sender | Receiver | Context |
|---|---|---|---|---|---|
| Ex. 1 | image | audio clip | Adam | [Bob, Chris] | [birthday, event] |
| Ex. 2 | ['holiday'] | audio clip | Adam | [Bob, Chris] | [birthday] |
| Ex. 3 | video | audio clip | Adam | [Bob, Chris] | [{chat:[{"Hi guys!",,...}], "Christmas"}] |
| Ex. 4 | audio clip | image | David | [@Friends] | [event] |
| Ex. 5 | audio clip | video | Emily | [@company] | [news, seriesA]) |

FIG. 6

AUDIO AND VISUAL ASSET MATCHING PLATFORM INCLUDING A MASTER DIGITAL ASSET

FIELD OF THE INVENTION

The present subject matter pertains to multimedia digital content. In particular, but not by way of limitation, the present subject matter provides systems and methods for identifying and matching audio and visual assets to facilitate the expression of emotions.

BACKGROUND

Multimedia content, such as text, audio, images, videos, animations, virtual environments, emoticons, and stickers, have the ability allow creators of the content to express their emotions and creativity. This same multimedia content can be shared with other individuals through messages, emails, files, or across social media to express emotions of the sender and elicit emotions from the recipient(s).

However, there remains a need to able to easily and automatically combine more than one multimedia content based on the multimedia content file, properties surrounding the multimedia content, the senders, receivers, and context. Additionally, there is a need to be able to understand peoples' reactions, expressions, and feedback in response to the merged multimedia content in order to continually improve the content matching.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are computer-implemented methods and systems for implementing and utilizing an audio and visual asset matching platform. In some example embodiments, a system for creating and using an audio and visual asset matching platform may include a first interface, a digital asset creation platform, an asset matching engine, and a user feedback engine. The first interface may be configured to select at least one master digital asset. The digital asset creation platform may be configured to create digital assets (also referred to herein as "audio and visual assets" and "multimedia content"), the digital assets comprising at least one of text, audio, image, video, 3D/4D virtual environment files, and animation files and metadata. The asset matching engine may be configured to match digital assets and generate at least one output digital asset. The user feedback engine may be configured to monitor and analyze behavior in response to receipt of at least one output digital asset and generate feedback metrics to improve the matching of the asset matching engine.

In some example embodiments, a method for creating and using an audio and visual asset matching platform may commence with selecting, via a first interface, at least one master digital asset. The method may continue with creating digital assets, by a digital asset creation platform, the digital assets comprising at least one of text, audio, image, video, 3D/4D virtual environment files, and animation files and metadata. The method may further continue with matching, by an asset matching engine, digital assets and generating at least one output digital asset. The method may further include monitoring and analyzing, by a user feedback engine, behavior in response to receipt of at least one output digital asset and generating feedback metrics to improve the matching of the asset matching engine.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not limitation, in the figures of the accompanying drawings, in which like references indicate similar elements.

FIG. 6 illustrates exemplary data provided to an asset matching engine, in accordance with various exemplary embodiments.

DETAILED DESCRIPTION

Figure 1:
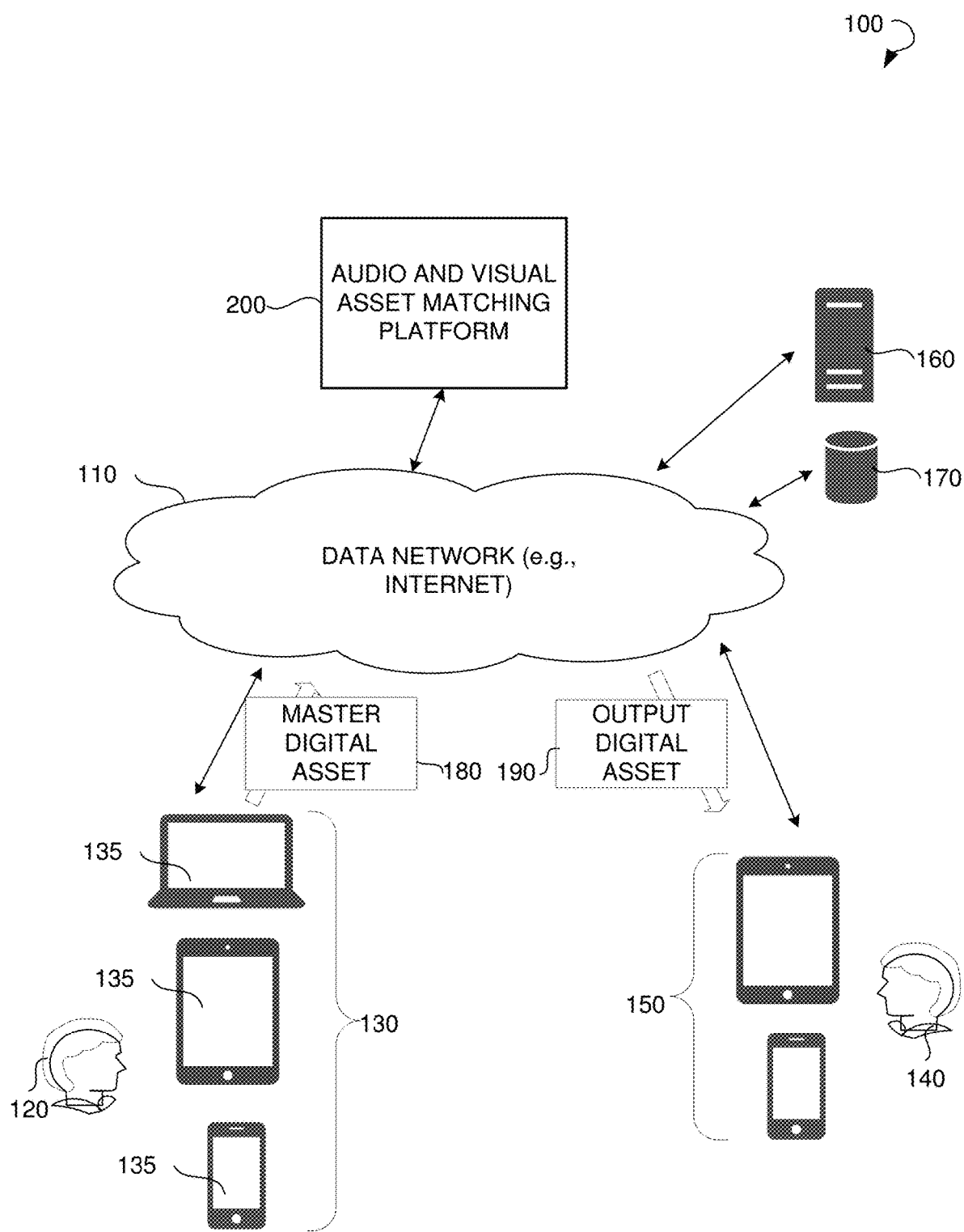
FIG. 1 illustrates a block diagram showing an environment within which an audio and visual asset matching platform may be implemented, in accordance with an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and changes can be made without departing from the scope of what is claimed. The following detailed description is, therefore, not to be taken in a limiting sense, and the scope is defined by the appended claims and their equivalents.

The techniques of the embodiments disclosed herein may be implemented using a variety of technologies. For example, the methods described herein may be implemented in software executing on a computing system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer, and so forth), a game console, a handheld gaming device, a cellular phone, a smart phone, a smart television system, and so forth. Different deployment architectures include servers in-the-cloud, in-house, or hybrid.

As outlined in the summary, the embodiments of the present disclosure are directed to implementing and using an audio and visual asset matching platform. According to example embodiments, systems and methods of the present disclosure provide an audio and visual content matching platform that allows a person, a sender, a creator, end users, artists, a business owner, a company, an advertiser, a digital content team, and any other person, group or organization to use multimedia content to generate different merged digital assets such as images, videos, animations, 3D/4D virtual environments, emoticons, and stickers with metadata to elicit a specific expression based in part on the senders, recipients, and context. The audio and visual asset matching platform may include a first user interface to select, create, or upload a master digital asset. A digital asset creation platform may extract the file(s), audio, video frames, properties, and data of digital assets adding metadata (such as: objects, text, and people detected, objects' movement trace in time information, moods, tags) based on inputs (such as: location, conversation context, timestamps, and shared profile information) and store them in a database. An asset matching engine can be used to match together digital assets based on their properties, metadata, the senders, the receivers, and context and generate output digital assets. A user feedback engine can be used to monitor the reactions, expressions, and responses to output digital assets in order to generate metrics to improve the asset matching engine.

Referring now to the drawings, FIG. 1 illustrates an environment 100 within which methods and systems for implementing and utilizing an audio and visual asset matching platform can be implemented. The environment 100 may include a data network 110 (e.g., an Internet), a first user 120, one or more electronic devices 130 associated with the first user 120, a second user 140, one of more electronic devices 150 associated with the second user 140, an audio and visual asset matching platform 200, a server 160, and a database 170.

The first user 120 may include a person, such as a person, a sender, a creator, end users, artists, a business owner, a company, an advertiser, a digital content team, and any other person, group or organization that would like to use the audio and visual asset matching platform 200 to create digital assets to help express emotions. The first user 120 may be an administrator or user of one or more electronic devices 130. The electronic devices 130 associated with the first user 120 may include a personal computer (PC), a tablet PC, a laptop, a smartphone, a smart television (TV), a virtual assistant, a game console, a 3D/4D device, and so forth. Each of the electronic devices 130 may include a first user interface 135. In some embodiments, a first user 120 may be optional. For example, an electronic device 130, such as a personal computer, can be programmed to use the audio and visual asset matching platform 200.

There may be multiple points of access to first user interface 135 such as by text or voice command through smartphones, TVs, gaming consoles, 3D/4D devices, and virtual assistants like Amazon's Alexa-controlled Echo® speaker, or other voice-controlled technology.

The second user 140 may include a receiver, a person, a group of people, or a group of potential recipients of an output, and so forth. The electronic devices 150 associated with the second user 140 may include a personal computer (PC), a tablet PC, a laptop, a smartphone, a smart television (TV), a smart speaker, a virtual assistant, a gaming console, a 3D/4D device, and so forth.

Each of the electronic devices 130, electronic devices 150, and the platform 200 may be connected to the data network 110. The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34b is analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network 110 may include a network of data processing nodes, also referred to as network nodes, that may be interconnected for the purpose of data communication.

The audio and visual asset matching platform 200 may be connected to the server(s) 160. The server(s) 160 may include a web service server, e.g., Apache or Nginx web server. The platform 200 may further be connected to the database 170. In an example embodiment, the information related to the first user 120 and the second user(s) 140 may be stored in the database 170 along with audio and visual assets and outputs.

The first user 120 may use one of the electronic devices 130 to provide information and content consolidated as a master digital asset 180 to the platform 200. A master digital asset 180 may include text, a tag, an image, a video, an audio clip, 3D/4D virtual environment, or an animation with their corresponding metadata (such as: location, tags, user profile and/or message context). The term "asset" as used herein, broadly describes not only file(s) or documents but also the surrounding aspects, properties, tags, and in general, metadata. In an example embodiment, the first user 120 may use an application executed on the electronic device 130 to request, select, or upload information that comprises a master digital asset 180. The platform 200 may process the master digital asset 180 and generate an output of a digital asset or a list of output digital assets 190 referred to herein as "slave asset(s)" and broadly described as digital assets being curated, created previously, or generated by a combination of the master digital asset with one or more digital assets. An asset matching engine 240, depicted in FIG. 2, of the platform 200 produces the output considering senders, recipients, and context information which includes among others: partner information, location, message history, and tags which enable the dynamic allocation of a list of matching rules which can consider a conversational mode where steps are considered to run campaigns. The conversational mode allows to apply a tree-like structure with the matching properties from the master digital asset as "root" and rules as "branches". The method how a "root" match selects the "branch" can be specified as, among others: randomly, using a round-robin system, or based on selection formula applying properties values which might be modified depending on the user feedback engine 250. Matching rules specify the method to find output of digital asset(s) matches or "slave asset(s)". A rule can include, among others, operators and matching schemes such as: regular expressions for text or tags, database queries, weights, conditional statements, grouping, valid digital asset types for given rule, pre-processing tasks, post-processing tasks, and/or prioritization schemes. Conditional statements may include fuzzy logic operators.

Referring back to FIG. 1, the execution of rules among the asset database 170 and master digital asset 180 produce the output digital asset(s) 190 which can include images, videos, documents, animations, 3D/4D virtual environments, emoticons, and stickers. The second user(s) 140 or recipients can then reply by sending a message back to the first user 120, express their like or dislike of the output digital asset 190, or create an output digital asset 190 of their own using another master digital asset 180 to share with first user 120.

Platform 200 allows partners to integrate with existing applications through an API, libraries, SDKs, source code, widgets, extensions, iframes, embedded content, etc. The API is used as a delivery carrier to partners, integrations, or in-house applications. In some instances, the API provides digital assets, searching or matching, and metrics and statistics.

Figure 2:
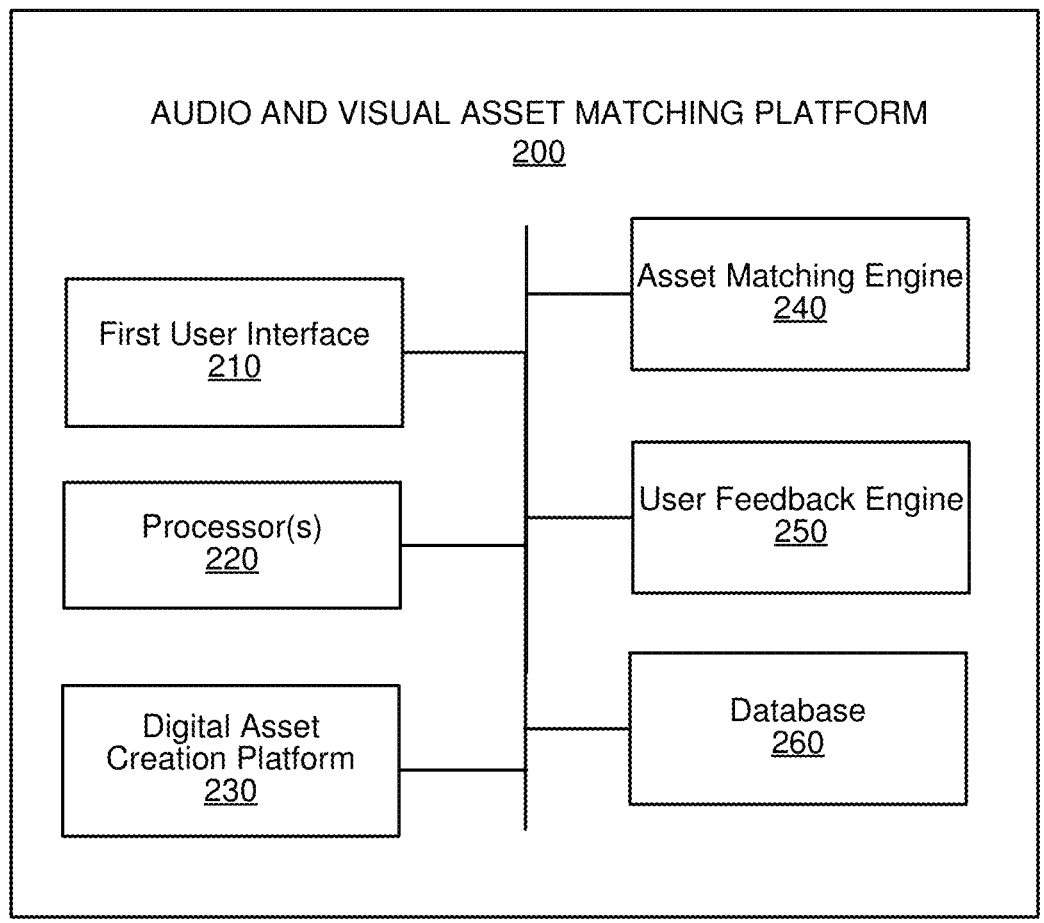
FIG. 2 is block diagram showing various modules of an audio and visual asset matching platform, in accordance with an example embodiment.

FIG. 2 shows a block diagram illustrating various modules of a platform 200 for audio and visual asset matching, according to an example embodiment. The platform 200 may include a first user interface 210, a processor 220, a digital asset creation platform 230, an asset matching engine 240, a user feedback engine 250, and a database 260.

The first user interface 210 can be associated with a electronic device 130 shown in FIG. 1 and can be configured to receive a master digital asset 180 from a first user 120. The first user may request, search, or upload a master digital asset 180. As mentioned above, the term "asset" as used herein, broadly describes not only file(s) and documents but also the surrounding aspects, properties, tags, and metadata. Digital assets may include audio, such as music, speech, or audio clips, images, videos, 3D/4D virtual environments, and animations. Digital assets may be created, curated, or updated through digital asset creation platform 230 and stored in database 260.

In an exemplary embodiment, an image asset may include a source image: "picture.jpg". In addition to the source image, digital asset creation platform 230 may assist with extracting data from the source image. For example, items within the image may be detected and decoupled from the image as other assets such as people, objects, and actions. When a person is detected, the following data elements can be created: PersonID: "00012232", Detached Image: "person 000112232.jpg", Type: "person". In some instances an object is detected and the following data elements can be created: "Detached Image: "table00012232.jpg", Type: "table". Also, a color analysis can be performed on the image such as color mapping and background detection. Further data may be extracted from the image such as location, author, tags, timestamps, resolution, image size, as well as any other data elements related to the image. In some embodiments, once one or more people are detected in an image, platform 200 may be able to detect who the people are and their preferences, which may influence which digital assets may be combined with that image asset.

According to various embodiments, properties included in a video asset may include frequency (speed of reproduction), frames per second, moving patterns (x, y, z) vectors of relevant elements in space with repeated trajectories as a timeline, color scheme in time, background, and objects in time where detachable elements can be detected in a video. For example, detachable elements may be any object, people, text banners, animals, etc., and with moving patterns the speed of music or beats per minute (BPM) can be matched to the movement of the moving pattern.

Figure 3:
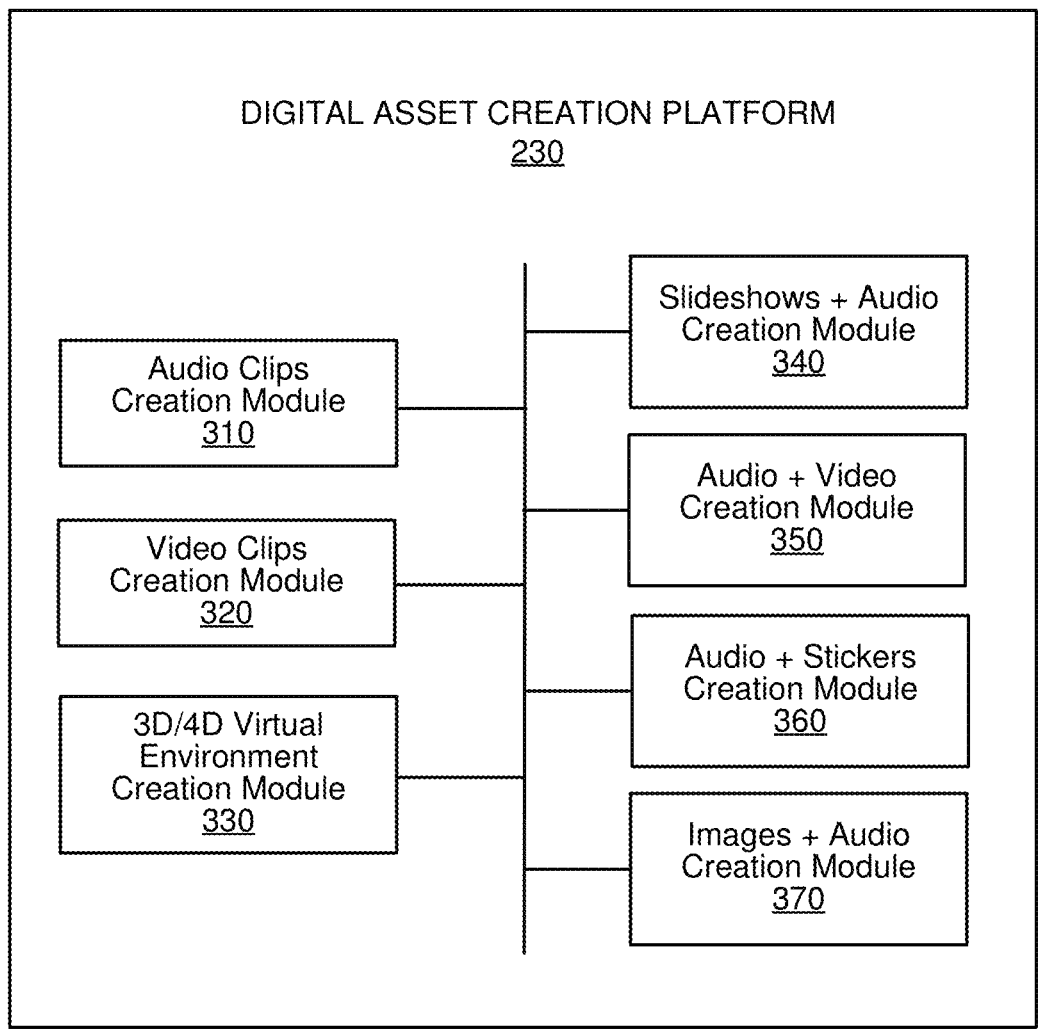
FIG. 3 illustrates a block diagram showing various modules of a digital asset creation platform, in accordance with an example embodiment.

FIG. 3 shows a block diagram illustrating various modules of digital asset creation platform 230, according to an example embodiment. The digital asset creation platform 230 may include an audio clips creation module 310, a video clips creation module 320, a 3D/4D environment creation module 330, a slideshows+audio creation module 340, an audio+video creation module 350, and audio+stickers creation module 360, images+audio creation module 370, and other creation modules In an exemplary embodiment of an audio clips creation module 310 that may be used for creating, curating, and/or updating audio clips, the following method described in FIG. 4 may be performed. In some embodiments, audio asset may be music or speech. An audio clip may be a portion of the audio asset that is less than the full length of the audio asset. In an alternative embodiment, an audio clip is a segment that ranges from 5 to 30 seconds long. However, an audio clip may be longer or shorter.

Figure 4:
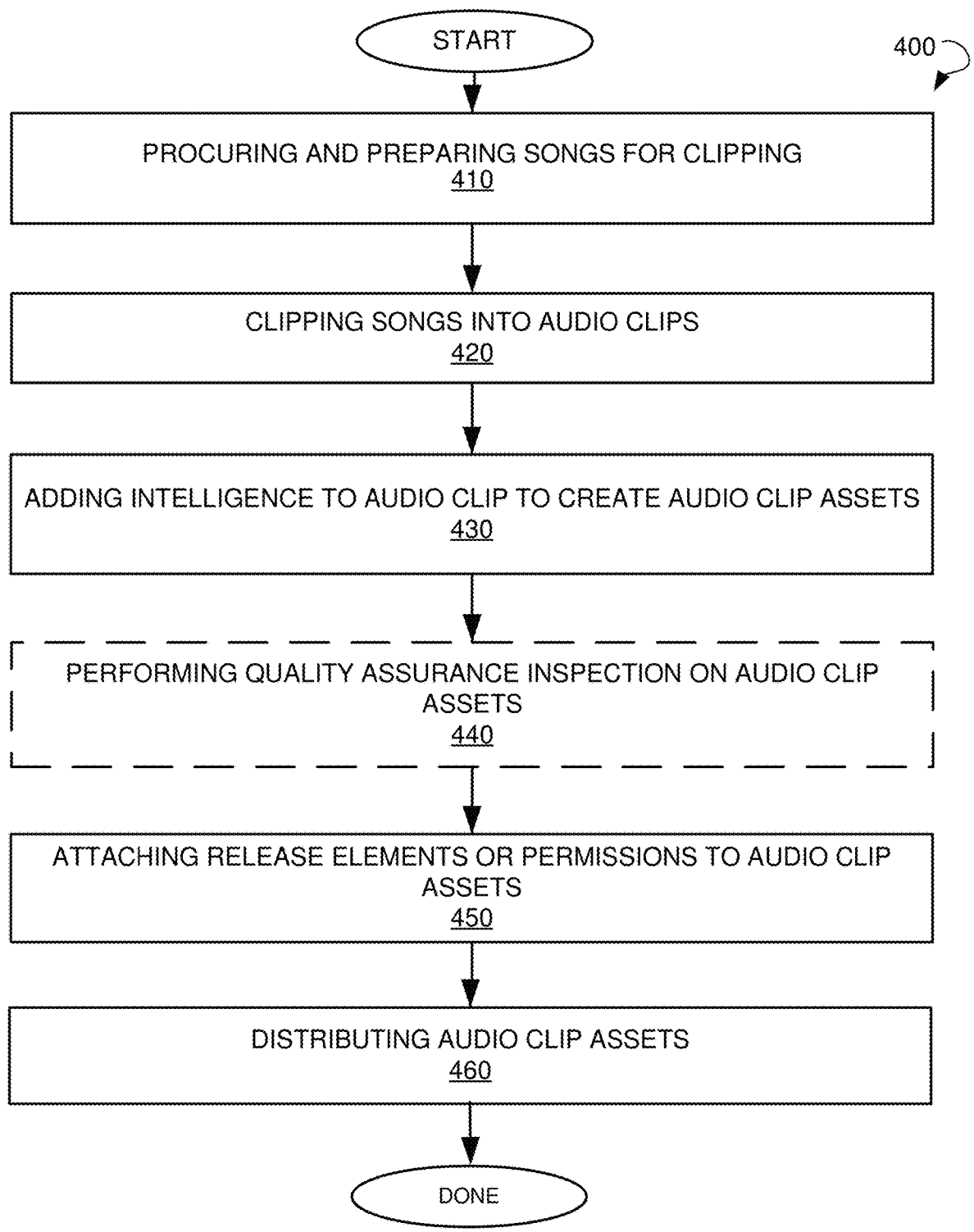
FIG. 4 is a flow chart illustrating a method for generating an audio clip asset, in accordance with an example embodiment.

FIG. 4 shows a process flow diagram of a method 400 for generating audio clip assets from a song by audio clips creation module 310, according to an example embodiment. In some embodiments, the operations may be combined, performed in parallel, or performed in a different order. The method 400 may also include additional or fewer operations than those illustrated. The method 400 may be performed by processing logic that may comprise hardware (e.g., decision making logic, dedicated logic, programmable logic, and microcode), software (such as software run on a general-purpose computer system or a dedicated machine), or a combination of both.

The method 400 may commence with procuring and preparing songs for clipping at operation 410. Millions of songs may be stored in database 260 or 170. Therefore, there is a need to prioritize which songs audio clips creation module 310 should generate clips for first and in what order. According to an exemplary embodiment, each song may have an external popularity score or external popularity information indicating how popular the song is with a broad set of users, by music genre, location, specific demographic group, or other parameters. For example, an external popularity score may be determined by a position in search rankings of the songs in one or more search engines, one or more music services, such as iTunes, or one or more music charts, such as the Billboard charts, Spotify or Top 40 charts. The priority order of songs can be continuously changing, modified, and updated by a learning system that receives these parameters.

Once the priority of songs is determined, the song candidates are retrieved from external sources such as from producers, publishers, artists, or music labels where license agreements are in place. Then attributes can be assigned to songs. For example, an attribute of a song may be the song's position on a music chart, if the song has a common lyric like "Happy Birthday", if a song is repeated in time, or if a song is part of a special campaign. In some instances, attributes can be manually assigned to a song by an administrator of platform 200.

Next each of the songs is given a score based on their attributes, and these scores are used by the audio clips creation module 310 to determine the order in which the songs will be produced into audio clips. For example, a production plan and schedule can be created based on the songs in the production queue.

The method 400 may continue with clipping songs into audio clips from the songs that were collected at operation 420. First, lyric and timing information is retrieved or built for selected songs. In some embodiments, LRC (LyRiCs format) information, comprising song lyrics and timing information, for a song is retrieved. However, sometimes LRC information is not accurate or may not be available for some songs so the system can include an automated validation of LRC information for a particular song. In various embodiments, lyric and timing information can also be manually created by retrieving lyric information for a song and setting the timing for each sentence in the song. Second, the selected song's audio file is downloaded. Third, an audio profile is built for each selected song. The audio profile may include any information related to a specific song such as BPM, an emotional graph showing how people respond to portions of the song over time and who responds with a particular emotion, an energy level graph showing how the energy level of the song varies over time, fingerprint, frequency highlights, genre, languages, tags per category, access restrictions, tempo, and relevancy factor.

Fourth, relevant fragments of the selected song are detected. In one embodiment, crowdsourced annotations of song lyrics can be used to determine relevant fragments. This crowdsourced information may act as social proof that people are interested in particular fragments of a song. Additionally, crowdsourced annotations can help with tagging songs with categories or emotions. In an alternative embodiment, sections of repetition in a song can be auto-detected, such as a chorus, in order to determine relevant fragments. Additional parameters, such as a time constraint ranging from 5 to 30 seconds can be incorporated into the auto-detection. Relevant fragments of a song may also be selected and processed manually.

Fifth, the relevant fragment can be validated that it is within the selected song because sometimes LRC information can be inaccurate. In some embodiments, audio clips creation module 310 can detect whether text from the lyric information is in the selected song. Sixth, the audio clips creation module 310 detects where to clip the fragments at appropriate start and end points. In some embodiments, start and end points can be detected based on the energy of a song. For example, a low energy section of a song may indicate an appropriate starting point of an audio clip. Lastly, the volume of a clip may need to be adjusted so that all the audio clips have the same volume. Special effects such as fade in and fade out can be included.

The method may continue with adding intelligence to the audio clip through tagging at operation 430. First, the language of the audio clip may be automatically detected. Second, relevant tags are detected for various categories. Some examples of categories to tag include any emotion, such as happy, sad, excited, angry, and lonely, or activities or themes such as trending, celebrate, holiday, birthday, hello, awkward, confused. Additionally, in some embodiments, a tag may be given a value of a graded scale, for example, 0 to 100 to enable fuzzy or standard conditional clauses. For example, an audio clip may not be 100% happy but instead is only 70% happy. A value of 70 may be assigned to that audio clip in the happy category. In some instances, an audio clip may be tagged in one or more categories, and each tag can be given a weighted value for the expression that has been tagged. In some embodiments, audio clips may be automatically tagged by analyzing the text of the audio clips. Audio clips may also be manually tagged or manually tagged in combination with automated tagging.

Next candidate tags may be found for the audio clip, and tags may be optimized. Lastly, an audio clip profile can be set for the audio clip. The audio clip profile may differ from the audio profile of an entire song, or they may be the same. An example of an occasion when an audio profile and an audio clip profile may differ is when a song has segments expressing various emotions such as in Bohemian Rhapsody by Queen. Various audio clips from that one song may be tagged in different categories. The audio clip profile may include any information related to the audio clip such as BPM, an emotional graph, an energy level graph, fingerprint, frequency highlights, genre, languages, tags per category, access restrictions, tempo, source song, and relevancy factor. In some embodiments, an emotional graph can incorporate and depict the weighted scale of emotions as mentioned above such that platform 200 is capable of indexing peoples' emotional interacts with music through sharing across social media or in messages. With this information, other users, such as advertisers will be able to tap into the emotional information of audio clips in order to merge a specific audio clip with an advertisement to target a specific demographic of people. In some embodiments, tagging of audio clips may also be dynamic based on information received from the user feedback engine 250 that will be discussed elsewhere within this application.

The method 400 may optionally include an operation 440, at which audio clips creation module 310 performs a quality assurance inspection to verify that the audio clip asset has the correct relevant information. In some embodiments, audio clips creation module 310 can automatically check for various parameters such as whether there are any issues with the tagging of the song clip. For example, audio clips creation module 310 can check whether an audio clip is 100% happy. Additionally, audio clips creation module 310 should not find the same audio clip to be tagged as 100% sad. If this occurs, audio clips creation module 310 will detect an issue with the tagging. Audio clips creation module 310 can also verify that the starting and ending points of an audio clip are correct by using an algorithm that can detect low energy within an audio clip. Audio clips creation module 310 can also detect whether the volume or fade in effects are proper. In some embodiments, audio clips that have received manual intervention, such as manual tagging or clipping, may require a little more inspection. According to various embodiments, manual quality assurance inspection may be performed by checking the quality of a selection of audio clips within a batch.

The method 400 may further include attaching release elements or permissions to audio clip assets at operation 450. In order to determine, where or how audio clips assets should be distributed, release elements or permissions can be attached to audio clip assets. Some release elements may include image generation, rights, country, and partners. For example, an audio clip asset may be generated for use for a specific partner and not to be used for any other purpose. Another example may be that a certain country, such as China, may have restrictions on content, words, or artists, and certain audio clip assets should not be distributed in those countries. Release elements can automatically be attached to audio clip assets in those exemplary scenarios. A partner may be running a specific campaign that is time sensitive, such as a seasonal campaign, or for a specific location, like a regional campaign, and therefore, require release elements pertaining to these distribution elements to be attached to audio clips. In some embodiments, the attachment of these release elements may be performed automatically or manually.

The method 400 may conclude with the distribution of audio clip assets at operation 460. Audio clip assets may be published and stored in database 260 or 170. In some embodiments, audio clip assets may be delivered to partners who may have requested customized tagging. Also, some partners may request usage reporting of statistics related to the usage of their audio clip assets. According to various embodiments, distribution of audio clip assets may be context aware. For example, electronic device 130 may be equipped with a GPS sensor, accelerometer, or compass to enable the detection of a current location of electronic device 130 and first user 120. Platform 200 can use a user's location to determine what type of audio clip assets should be distributed to that user based on what is currently relevant in that specific location. By using context, platform 200 can deliver the right audio clip asset merged with another digital asset in the right scenario.

Referring back to FIG. 2, once digital assets have been created and stored to database 260, asset matching engine 240 determines how to match one or more digital assets to create an output digital asset.

Figure 5:
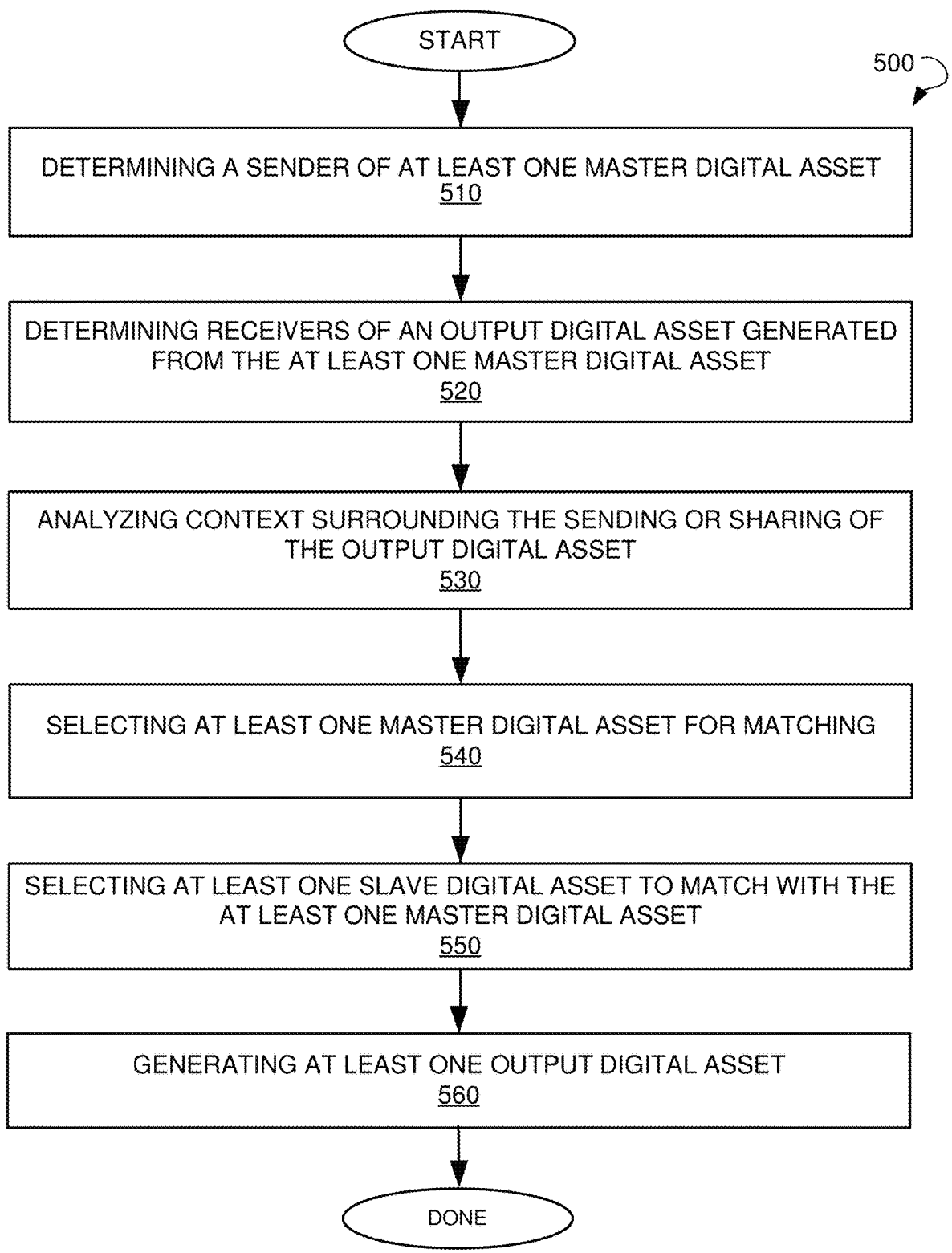
FIG. 5 is a flow chart illustrating a method for matching digital assets by an asset matching engine, in accordance with an example embodiment.

FIG. 5 shows a process flow diagram of a method 500 for matching digital assets by asset matching engine 240, according to an example embodiment. In some embodiments, the operations may be combined, performed in parallel, or performed in a different order. The method 500 may also include additional or fewer operations than those illustrated. The method 500 may be performed by processing logic that may comprise hardware (e.g., decision making logic, dedicated logic, programmable logic, and microcode), software (such as software run on a general-purpose computer system or a dedicated machine), or a combination of both.

The method 500 may commence with determining the sender of a master digital asset at operation 510. A sender may include a person, a creator or owner of the output digital asset, a company, a client, a content team, a computer, or a sender may be optional. For example, an output digital asset may be created on behalf a company who wants an output digital asset for an advertising campaign or a social media manager of a company may use platform 200 to automatically create output digital assets daily based on their demographics.

According to various embodiments, a sender profile may be analyzed. A sender's profile may include location; preferences, such as interests, groups, and music; personal information, such as age and gender; and social relationships such as friends, family, son/daughter, or spouse.

The method 500 may continue with determining the receivers of the output digital asset at operation 520. A receiver may include a person, a group of people, a group of people that are potential or targeted recipients of the output digital asset, or a receiver may be optional. A receiver profile may also be analyzed. Similarly, a receiver's profile may include location; preferences, such as interests, groups, and music; personal information, such as age and gender; and social relationships such as friends, family, son/daughter, or spouse.

The method 500 may further include analyzing the context surrounding the sending or sharing of an output digital asset at operation 530. Context may include conversation history, emotional graph in time, relationship between senders and receivers, events, location, time of day, profile history, music tastes, likes and dislikes, or any information that may provide insight. Previous conversation history can provide context for matching slave digital assets to a master digital asset so that the output digital asset shared within the conversation will be relevant. However, in some instances, context may not be available. Therefore, including context may be optional. Analysis of conversation history may also yield an emotional graph in time. For example, at a certain point in time the sender or receiver may be 80% happy and 20% sad. An object graph in time may be created based on events such as entertainment, vacations, greetings, birthdays, etc.

The method 500 may continue with selecting a master digital asset for matching at operation 540. A master digital asset may include text, a tag, an image, a video, an audio clip, an animation, 3D/4D virtual environment element, or any asset selected or uploaded by a first user. In some embodiments, there may be more than one master digital asset. For example, a user may perform a text search for a digital asset but no digital assets matching the text search is found. In response, the user uploads his or her own video. In this instance, the master digital asset can be both the text search and the video. With the selection of one or more master digital assets, asset matching engine 240 can find other digital assets to match and merge with the one or more master digital assets.

The method 500 may further include selecting one or more slave digital assets to match with the one or more master digital assets at operation 550. Asset matching engine 240 utilizes a unique algorithm to match master digital assets with slave digital assets. In some embodiments, asset matching engine 240 produces the output considering senders, recipients, and context information which includes among others: partner information, location, message history and tags which enable the dynamic allocation of a list of matching rules which can consider a conversational mode where steps are considered to run campaigns. The conversational mode allows to apply a tree-like structure with the matching properties from the master digital asset as "root" and rules as "branches". The method how a "root" match selects the "branch" can be specified as, among others: randomly, using a round-robin system or based on selection formula applying properties values which might be modified depending on the user feedback engine 250. Matching rules specify the method to find output of digital asset(s) matches or "slave asset(s)". A rule can include, among others, operators and matching schemes such as: regular expressions for text or tags, database queries, weights, conditional statements, grouping, valid digital asset types for given rule, pre-processing tasks, post-processing tasks, and/or prioritization schemes. Conditional statements may include fuzzy logic operators. The execution of rules among the asset database 170 and master digital asset 180 produce the output digital asset(s) 190 which can include images, videos, documents, animations, 3D/4D virtual environments, emoticons, and stickers.

According to some embodiments, the tagged categories of the digital assets are used to match other related digital assets. Also, tags can be prioritized based on their relevance to the digital asset. By using the attributes of the master digital asset, asset matching engine 240 can search through slave digital assets to determine which slave digital assets best match the attributes of the master digital asset. In some embodiments, the slave digital assets may receive a weighted score calculated by the asset matching engine 240 based on attributes of the digital assets.

FIG. 6 illustrates some exemplary embodiments of data provided to asset matching engine 240. In Ex. 1, the master digital asset is an image asset. The image asset is to be matched to an audio clip asset. The sender is Adam, and Adam is sending the output digital asset to Bob and Chris. The context surrounding the output digital content is "[birthday, event]". "Birthday" may be an array of elements not only including "birthday" but also possibly the location, date, time, or attendees of the birthday. Using all this information in combination with the data associated with the digital assets, asset matching engine 240 can select a set of rules to apply for matching and merge one or more slave digital assets to generate one or more output digital assets. In Ex. 2, the sender Adam is searching for the text "holiday" either through a text search or voice command and would like to find a matching audio clip asset. In. Ex. 3, Adam is having a conversation with Bob and Chris about Christmas, and Adam would like to merge a video to an audio clip to send to Bob and Chris that is related to their conversation history. In some embodiments, Adam may upload a video from his smartphone. Video clips creation module 320 can process the video on demand into a video asset, and optionally save the video asset to database 260 or 170. In Ex. 4, Dave would like to share an output digital asset with all of his friends. In Ex. 5, Emily would like to share an output digital asset with the employees at her company that is related to the company's Series A financing.

Referring back to FIG. 5, the method 500 may conclude with generating one or more output digital assets by matching one or more slave digital assets to one or more master digital assets at operation 560. In some embodiments, master digital assets and slave digital assets are strategically merged in order to generate an output digital asset. In some embodiments, each digital asset is analyzed. For example, when an image asset is matched with an audio clip asset some aspects of an image asset that are analyzed include color by zone, palette, color relevancy map, RGB tone map, identified objects, scene detection, detachable objects from image, and potential templates. For audio clips, energy level detection may be analyzed. When merging the digital assets, there may be scripts with timelines or story flow recipes. In some embodiments, effects may be added to output digital asset such as trimming to an image, transitions between detachable objects, or music effects.

According to an exemplary embodiment where a video asset is matched to an audio clip asset, the following video asset aspects can be analyzed: length, video topology detection of verbs, nouns, such as objects or people, places, and time, scene detection of intent and the timeline per noun, such as move frequency or weight on full video. Then the video asset can be merged with the audio clip asset. In another embodiment, music assets can be matched to image assets or video assets. The follow music aspects can be analyzed: temperature, climax detection, socially relevant section, and lyrics. Then the music asset can be merged with an image asset or a video asset.

Referring back to FIG. 2, once an output digital asset has been generated and sent or shared, user feedback engine 250 can analyze the behavior in response to receipt of an output digital asset using feedback metrics. For example, if two users are chatting via a Facebook Chat Extension, and the first user sends the second user an output digital asset, the second user has a button to reply instantly. The length of time between the sharing event and reply can be a metric used by the user feedback engine 250.

According to some embodiments, user feedback engine 250 can trace all actions and events that occur before the sharing event, at the sharing event, and after the sharing event. In some instances, the context surrounding a sharing event can shift. For example, a user may have been looking for a happy audio clip asset to be paired with the image asset she wanted to send. If platform 200 delivers an output digital asset to the user, and the user shares the output digital asset, this sharing event provides confirmation to the user feedback engine 250 that the slave digital asset and output digital asset generated qualify as happy. On the other hand, if platform 200 delivers the user an output digital asset that is clicked on but isn't shared, user feedback engine can understand that the output digital asset may not have been generated from a good match. With this information, platform 200 can measure success in context and can learn from what might have or might not have been correct in the matching. The selection criteria of rules can be changed as well based on feedback. In another example, platform 200 may recognize that a user is in specific geographic location and that the user would like the output digital asset to be relevant to that specific geographic location. If the user shares the output digital asset, this action acts as confirmation that the slave digital asset was applicable to the master digital asset.

Some exemplary metrics that can be implemented by user feedback engine 250 include monitoring the number of times an output digital asset is shared and assigning the number of shares a value, monitoring tagging categories for which more clicks have been received and assigning the tagging categories scores, or monitoring reply times by receivers, types of replies, and number of replies. If a user is presented with multiple output digital assets after searching for "happy" or "holiday", user feedback engine 250 can derive meaning when a user clicks on the third or fourth options rather than the first. In some embodiments, user feedback engine 250 can assign a higher score to the options that are clicked on. Also, user feedback engine 250 can extract down to which output digital asset combination is happier than another output digital asset even if both are considered happy. It's also possible that there may be a particular song that gets shared more in the happy category no matter what digital asset it is paired with, and user feedback engine 250 will understand this. In another embodiment, a second output digital asset can be generated to reply to a first output digital asset that was shared. User feedback engine 250 can use this conversation chain of assets as feedback as to how people have engaged with these assets. In some embodiments, platform 200 indexes the way people interact and message with music.

In a scenario, when platform 200 is used to generate output digital assets for advertisements, additional metrics such as click-through rates, actual conversion to purchase, customer engagement, and other conversion rates can be monitored and utilized by user feedback engine 250.

The information related to behavior and feedback that is collected and examined by user feedback engine 250 can be used to improve the matching performed by asset matching engine 240.

Figure 7:
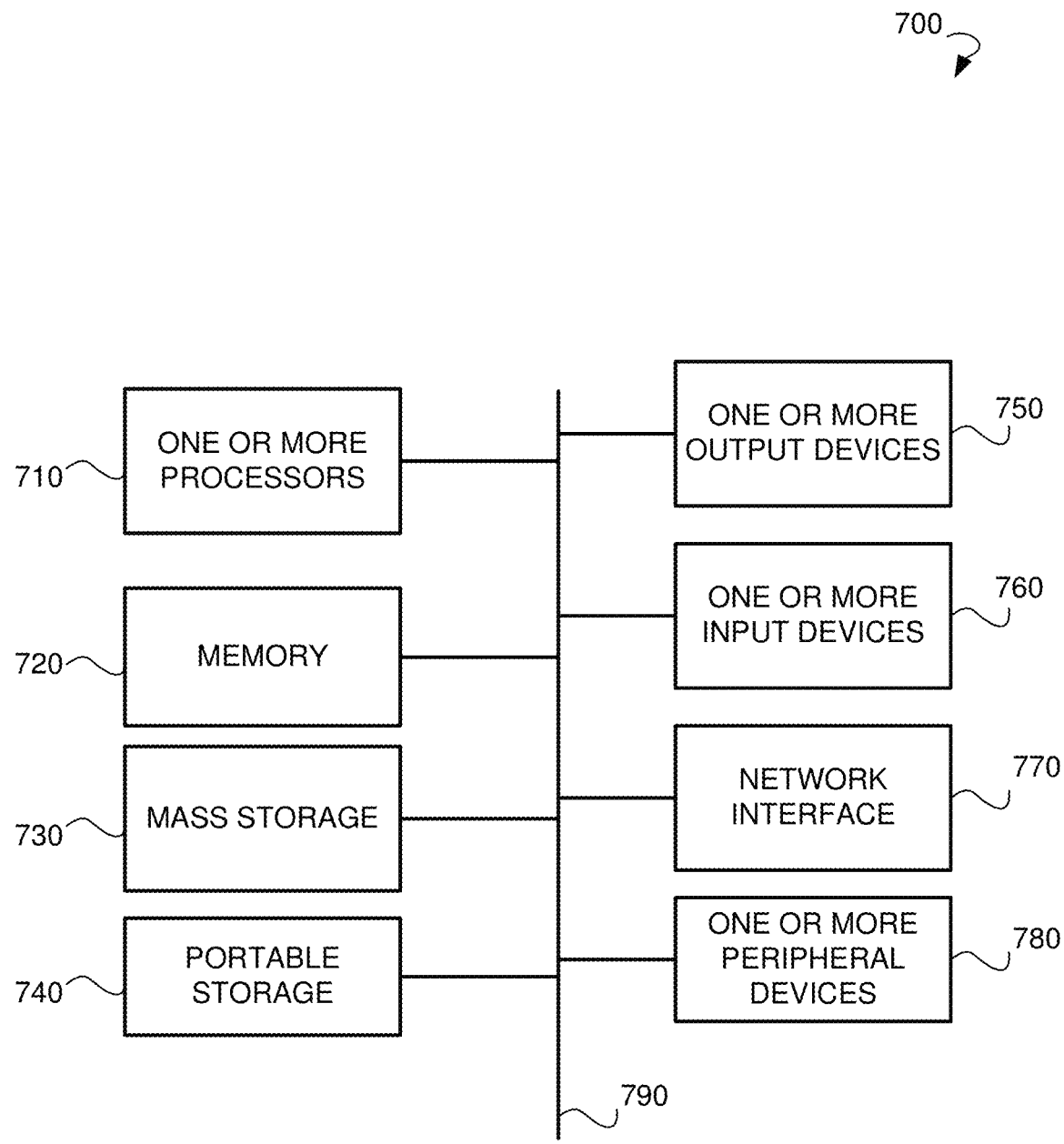
FIG. 7 illustrates a diagrammatic representation of an example machine in the form of a computing system within which a set of instructions for causing the machine to perform any one or more of the methodologies discussed herein is executed.

FIG. 7 illustrates an exemplary computing system 700 that may be used to implement embodiments described herein. The computing system 700 of FIG. 7 may include one or more processors 710 and memory 720. Memory 720 stores, in part, instructions and data for execution by the one or more processors 710. Memory 720 can store the executable code when the computing system 700 is in operation. The computing system 700 of FIG. 7 may further include a mass storage 730, portable storage 740, one or more output devices 750, one or more input devices 760, a network interface 770, and one or more peripheral devices 780.

The components shown in FIG. 7 are depicted as being connected via a single bus 790. The components may be connected through one or more data transport means. One or more processors 710 and memory 720 may be connected via a local microprocessor bus, and the mass storage 730, one or more peripheral devices 780, portable storage 740, and network interface 770 may be connected via one or more input/output (I/O) buses.

Mass storage 730, which may be implemented with a magnetic disk drive or an optical disk drive, is a non-volatile storage device for storing data and instructions for use by a magnetic disk or an optical disk drive, which in turn may be used by the one or more processors 710. Mass storage 730 can store the system software for implementing embodiments described herein for purposes of loading that software into memory 720.

Portable storage 740 operates in conjunction with a portable non-volatile storage medium, such as a compact disk (CD) or digital video disc (DVD), to input and output data and code to and from the computing system 700 of FIG. 7. The system software for implementing embodiments described herein may be stored on such a portable medium and input to the computing system 700 via the portable storage 740.

One or more input devices 760 provide a portion of a user interface. One or more input devices 760 may include an alphanumeric keypad, such as a keyboard, for inputting alphanumeric and other information, or a pointing device, such as a mouse, a trackball, a stylus, or cursor direction keys. Additionally, the computing system 700 as shown in FIG. 7 includes one or more output devices 750. Suitable one or more output devices 750 include speakers, printers, network interfaces, and monitors.

Network interface 770 can be utilized to communicate with external devices, external computing devices, servers, and networked systems via one or more communications networks such as one or more wired, wireless, or optical networks including, for example, the Internet, intranet, LAN, WAN, cellular phone networks (e.g. Global System for Mobile communications network, packet switching communications network, circuit switching communications network), Bluetooth radio, and an IEEE 802.11-based radio frequency network, among others. Network interface 770 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 780 may include any type of computer support device to add additional functionality to the computing system 700. One or more peripheral devices 780 may include a modem or a router.

The components contained in the computing system 700 of FIG. 7 are those typically found in computing systems that may be suitable for use with embodiments described herein and are intended to represent a broad category of such computer components that are well known in the art. Thus, the computing system 700 of FIG. 7 can be a PC, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as Random Access Memory (RAM). Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

In some embodiments, the computing system 700 may be implemented as a cloud-based computing environment, such as a virtual machine operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, methods and systems for implementing and using an audio and visual asset matching platform have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A system for creating and using an audio and visual asset matching platform, the system comprising:
   a first interface configured to select at least one master digital asset;
   a digital asset creation platform configured to create digital assets, the digital assets comprising at least one of text, audio, image, video, 3D/4D virtual environments, and animation files and metadata;
   wherein the digital asset creation platform comprises an audio clips creation module configured to generate at least one audio clip asset, the generating comprising:
   procure and prepare songs for clipping;
   clip songs into audio clips;
   add intelligence to the audio clips to create audio clip assets;
   attach release elements to audio clip assets; and
   distribute audio clip assets;
   an asset matching engine configured to match digital assets and generate at least one output digital asset; and
   a user feedback engine configured to monitor and analyze behavior in response to receipt of the at least one output digital asset and generate feedback metrics to improve the matching of the asset matching engine.

2. The system of claim 1, further comprising a database configured to store at least one of the following: digital assets, output digital assets, first user data, and second user data.

3. The system of claim 1, wherein a length of the audio clips range from 5 to 30 seconds.

4. The system of claim 1, wherein the adding intelligence to the audio clips to create audio clip assets further comprises:
tagging the audio clip assets with one or more emotions.

5. The system of claim 4, wherein the tagging of audio assets with one or more emotions is on a graded scale, category like structure with ownership metric on a graded scale.

6. The system of claim 1, wherein the release elements comprises at least one of the following: a location restriction, a time restriction, a content restriction, a partner restriction, and an artist restriction.

7. The system of claim 1, wherein the asset matching engine is further configured to:
determine a sender of the at least one master digital asset;
determine receivers of the at least one output digital asset generated from the at least one master digital asset;
analyze context surrounding a sending or a sharing of the at least one output digital asset;
select the at least one master digital asset for matching;
select at least one slave digital asset to match with the at least one master digital asset; and
generate the at least one output digital asset.

8. The system of claim 7, wherein the context comprises at least one of: conversation history, emotional graph in time, relationship between senders and receivers, events, location, time of day, profile history, and music taste.

9. The system of claim 1, wherein the user feedback engine is further configured to perform at least one of the following:
monitoring a number of times the output digital asset is shared and assigning a number of shares a value;
monitoring tagging categories for which more clicks have been received and assigning the tagging categories scores; and
monitoring reply times by receivers, types of replies, and number of replies.

10. A method for creating and using an audio and visual asset matching platform, the method comprising:
selecting, via a first interface, at least one master digital asset;
creating digital assets, by a digital asset creation platform, the digital assets comprising at least one of text, audio, image, video, 3D/4D virtual environments, and animation files and metadata;
the creating digital assets comprising:
procuring and preparing songs for clipping;
clipping songs into audio clips;
adding intelligence to the audio clips to create audio clip assets;
attaching release elements to the audio clip assets; and
distributing the audio clip assets;
matching, by an asset matching engine, the digital assets and generating at least one output digital asset; and
monitoring and analyzing, by a user feedback engine, behavior in response to receipt of the at least one output digital asset and generating feedback metrics to improve the matching of the asset matching engine.

11. The method of claim 10, wherein a length of the audio clips range from 5 to 30 seconds.

12. The method of claim 10, wherein the adding intelligence to the audio clips to create audio clip assets further comprises:
tagging the audio clip assets with one or more emotions.

13. The method of claim 12, wherein the tagging of audio assets with one or more emotions is on a graded scale, category like structure with ownership metric on a graded scale.

14. The method of claim 10, wherein the release elements comprises at least one of the following: a location restriction, a time restriction, a content restriction, a partner restriction, and an artist restriction.

15. The method of claim 10, wherein the matching digital assets and generating at least one digital asset further comprises:
determining a sender of the at least one master digital asset;
determining receivers of the at least one output digital asset generated from the at least one master digital asset;
analyzing context surrounding a sending or sharing of the at least one output digital asset;
selecting the at least one master digital asset for matching;
selecting at least one slave digital asset to match with the at least one master digital asset; and
generating the at least one output digital asset.

16. The method of claim 15, wherein context the comprises at least one of: conversation history, emotional graph in time, relationship between senders and receivers, events, location, time of day, profile history, and music taste.

17. The method of claim 10, wherein the monitoring and analyzing behavior and generating feedback metrics comprises at least one of the following:
monitoring a number of times the output digital asset is shared and assigning the number of shares a value;
monitoring tagging categories for which more clicks have been received and assigning the tagging categories scores; and
monitoring reply times by receivers, types of replies, and number of replies.

18. A system for creating and using an audio and visual asset matching platform, the system comprising:
a first interface configured to select at least one master digital asset;
a digital asset creation platform configured to create digital assets, the digital assets comprising at least one of text, audio, image, video, 3D/4D virtual environments, and animation files and metadata;
wherein the digital asset creation platform comprises an audio clips creation module configured to generate at least one audio clip asset, the generating comprising:
procure and prepare songs for clipping;
clip songs into audio clips;
add intelligence to the audio clips to create audio clip assets;
attach release elements to audio clip assets; and
distribute audio clip assets;
an audio clips creation module configured to clip songs into audio clips and tag the audio clips with categories of expression;
an asset matching engine configured to:
match digital assets and generate at least one output digital asset; and
a user feedback engine configured to monitor and analyze behavior in response to receipt of the at least one output digital asset and generate feedback metrics to improve the matching of the asset matching engine.

19. A system for creating and using an audio and visual asset matching platform, the system comprising:
a first interface configured to select at least one master digital asset;

a digital asset creation platform configured to create digital assets, the digital assets comprising at least one of text, audio, image, video, 3D/4D virtual environments, and animation files and metadata;
an asset matching engine configured to:
 match digital assets and generate at least one output digital asset;
 determine a sender of at least one master digital asset;
 determine receivers of at least one output digital asset generated from the at least one master digital asset;
 analyze context surrounding a sending or sharing of at least one output digital asset;
 select at least one master digital asset for matching;
 select at least one slave digital asset to match with the at least one master digital asset; and
 generate at least one output digital asset; and
a user feedback engine configured to monitor and analyze behavior in response to receipt of at least one output digital asset and generate feedback metrics to improve the matching of the asset matching engine.

20. A method for creating and using an audio and visual asset matching platform, the method comprising:
 selecting, via a first interface, at least one master digital asset;
 creating digital assets, by a digital asset creation platform, the digital assets comprising at least one of text, audio, image, video, 3D/4D virtual environments, and animation files and metadata;
 matching, by an asset matching engine, digital assets and generating at least one output digital asset comprising:
  determining a sender of at least one master digital asset;
  determining receivers of at least one output digital asset generated from the at least one master digital asset;
  analyzing context surrounding a sending or sharing of at least one output digital asset;
  selecting at least one master digital asset for matching;
  selecting at least one slave digital asset to match with the at least one master digital asset; and
  generating at least one output digital asset; and
 monitoring and analyzing, by a user feedback engine, behavior in response to receipt of at least one output digital asset and generating feedback metrics to improve the matching of the asset matching engine.

* * * * *